United States Patent Office 3,639,510
Patented Feb. 1, 1972

3,639,510
REACTION OF FLUORINE WITH POLYPERFLUOROPOLYENES
T. O. Paine, Administrator of the National Aeronautics and Space Administration, with respect to an invention of Madeline S. Toy, Fountain Valley, Calif.
No Drawing. Filed Mar. 26, 1969, Ser. No. 810,815
Int. Cl. C08f 3/20, 27/03, 29/22
U.S. Cl. 260—877     7 Claims

ABSTRACT OF THE DISCLOSURE

Polyperfluoropolyenes such as polyperfluorobutadiene are reacted with fluorine to either provide a saturated polymer chain and/or create reactive sites on the polymer chain which is then followed by exposure to a monomeric species which undergoes free radical polymerization to graft the monomer onto the polyperfluoropolyene.

ORIGIN OF THE INVENTION

The invention described herein was made in the performance of work under a NASA contract and is subject to the provisions of Section 305 of the National Aeronautics and Space Act of 1958, Public Law 83–568 (73 Stat. 435; 42 USC 2457).

BACKGROUND OF THE INVENTION

(1) Field of the invention

This invention is in the field of new polymers and their method of manufacture. More particularly, the invention relates to a new series of grafted fluoropolymers and the method of their manufacture.

(2) Description of the prior art

Prior to the herein invention there had been little attempt to graft-copolymerize various monomeric materials with polyperfluoropolyenes. The closest approach in the prior art to that to be described in the herein invention relates to the utilization of fluorine gas under extremely high pressures on polyperfluorobutadiene. Under such conditions of high pressure a highly cross-linked and saturated polymer was obtained. However, no attempt was made to graft monomeric materials onto the polyperfluorobutadiene to achieve a graft or cross-link network, nor was the polyperfluorobutadiene saturated at conditions other than those of the extremely high pressure.

OBJECTS AND SUMMARY OF THE INVENTION

Thus, an object of this invention is to provide a new series of grafted perfluoropolymers.

Another object of this invention is to provide a novel method for grafting monomers onto polyperfluoropolyenes.

Still a further object of this invention is to provide a novel method for saturating polyperfluoropolyenes.

The above and other objects of this invention are accomplished by providing a polyperfluoropolyene in a finely divided form. The polymeric material is then contacted with fluorine gas at a pressure preferably of 1 atmosphere or less. The length of time and temperature of reaction will affect the end product. At ambient temperature in a relatively short time, free radicals are generated on the polymer chain. At longer contact time and higher temperatures not only are free radicals formed but the polymeric material will tend to become further saturated and also to reduce the presence of free radicals. After the free radicals have been formed on the polymer chain, the polymer can then be contacted with any monomers which undergo free radical polymerization. Such monomers will then graft themselves onto the polyperfluoropolyene chain. The resulting family of new polymers having a backbone of fluorocarbons will have good chemical resistance, thermal stability and low temperature properties. Thus they are suitable for various applications including seals, coatings, potting compounds and the like where such severe conditions are met. It is believed the invention will be better understood from the following detailed description.

DESCRIPTION OF THE PREFERRED EMBODIMENTS

The herein invention is based upon initiation of fluorocarbon radicals on polyperfluoropolyene chains by the utilization of gaseous fluorine in the absence of any catalyst. The fluorine molecule may first split into atoms in accord with the following reaction:

(1) $F_2 \rightleftharpoons 2F$

Alternatively, the fluorine gas can break down to the atoms in the presence of double bonds in accord with the following reaction:

(2) $-CF_2CF\!=\!CFCF_2\!-\!+F\!-\!F$
$\rightarrow -CF_2CF_2CFCF_2\!-\!+F$ After the atoms are formed, a chain initiation mechanism occurs accoding to the following reaction:

(3) $-CF_2CF\!=\!CFCF_2\!-\!+F\cdot \rightarrow -CF_2CF_2CFCF_2\!-$

The above reaction 3 can then be followed by a dimerization in accord with the following reaction:

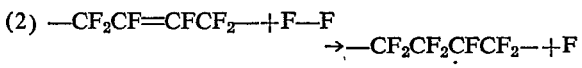
(4)  $-CF_2CF_2CFCF_2- \longrightarrow -CF_2CF_2CFCF_2-$
                                   $-CF_2CF_2-CF-CF_2-$ Alternatively, reaction 3 can be followed by a saturation in accord with the following reaction:

(5) $-CF_2CF_2CFCF_2\!-\!+F\cdot \rightarrow -CF_2CF_2CF_2CF_2\!-$

Alternative to either Reactions 4 or 5 in stopping the chain initiation at Reaction 3 and utilizing the product of Reaction 3 to achieve a graft polymerization in the presence of monomeric species which undergo free radical polymerizations.

It should be apparent in view of the aforegoing reaction and explanation of the basis of the herein invention that any perfluorinated polymer containing double bonds is satisfactory. Since fluorine is extremely reactive, other then perfluorinated materials would be attacked at various positions and not achieve the desired results. For example, fluorine would tend to selectively replace hydrogen if it were present on the polymer chain and not provide a chain initiation mechanism as in Reaction 3. A typical example of a polyperfluoropolyene is polyperfluorobutadiene. Other examples include polyperfluoropentadiene, polyperfluoroheptadiene, polyperfluorooctadiene and nitrose rubber containing perfluorobutadiene as the termonomer ($CF_3NO/CF_2\!=\!CF_2/CF_2\!=\!CFCF\!=\!CF_2$).

The monomeric species that can be grafted onto the polymer chain in accord with this invention are, as indicated, any materials that undego free radical polymerization. Typical and suitable examples include the highly fluorinated materials such as tetrafluoroethylene, perfluorobutadiene and perfluoropropylene oxide. Typical example of a nonfluorinated material is ethylene oxide. No need is seen to provide extensixe listing of monomers that undergo such free radical polymerizations since they are well known in the art and it should be apparent to those skilled that such will react at the sites provided in accord with the product of the Reaction 3.

To perform the method of the invention and form the resultant products thereof, a vacuum manifold system is utilized which is constructed of stainless steel so as not to be affected by the fluorine gas. In order to achieve maximum results, the polymer should have as large a surface area as possible and allow for maximum saturation of or contact with the fluorine gas. Various techniques can be utilized, such as ball milling the polymer or the like.

One approach that provides for a fluffy low-density polymer, which is particularly useful in the herein invention, involves forming a slurry of the polymer in a suitable solvent therefor. A slurry is formed since most of the polymers contemplated by the invention will not fully dissolve. Of course, if they do, then a solution will be obtained. With polyperfluorobutadiene, a solvent such as hexafluorobenzene is utilized. The polymer is stirred in the solvent until a maximum amount is dissolved. The mixture is then frozen by using a bath of Dry Ice or liquid nitrogen and then evacuated at ambient temperature with the receiver chilled in a bath of Dry Ice or liquid nitrogen. The solvent is then sublimed from the mixture, resulting in a polymer that is quite fluffy, having a low density. The low density polymer is then placed in a glass bulb or started with freeze drying in a glass bulb, which is then connected to the vacuum manifold system. Additionally connected to the manifold system, of course, is a source of fluorine gas. The fluorine gas is then fed to the polymer material. However, prior to contacting the polymer, the fluorine preferably first passes through a conventional scrubber.

Particularly for safety purposes, it is preferable to chill the polymer material in the glass bulb prior to its contact with the fluorine gas. The material is chilled to the point where it will not ignite when initially contacted with the fluorine. Of course, not all materials will ignite with fluorine at ambient temperatures and thus do not require such chilling, but for safety purposes it is desirable to chill the material. Thus, Dry Ice or liquid nitrogen bath can be used.

The pressure in the manifold before admitting the fluorine gas is preferably adjusted between ⅙ and ⅔ of an atmosphere. Once again this is primarily a safety feature to prevent any explosion or ignition from occurring. Additionally, it has been found that the reaction proceeds quite satisfactorily at the low pressure. In fact, maximum results are generally obtainable at about ⅔ of an atmosphere to generate the free radicals.

When the fluorine gas is admitted to the Pyrex bulb containing the polymer material and initial contact is made between the two materials, the cold bath surrounding the Pyrex bulb is removed and its temperature allowed to return to approaching ambient conditions. It has been found that the reaction between the fluorine and the polymer material will generally occur beginning at $-20°$ C. The cold bath coolant is a mixture of Freon and liquid nitrogen which can be easily adjusted to any temperature range between $-100°$ C. to $10°$ C. In order to increase the temperature more Freon is added and to decrease the temperature more liquid nitrogen is added. Alternatively, a heater could be used to warm the bath. As indicated, during the time that the fluorine gas is flowing into the tube containing the polymer, the pressure is maintained at ambient or below.

In order to generate free radical sites in accord with Reaction 3 above the polymer should be contacted with the fluorine for at least three minutes at ambient temperature. Thus, though the fluorine is preferably admitted to an extremely cold polymer, the time of reaction is measured from the point where the polymer has reached preferably ambient temperature. The length of contact between the fluorine and the polymer can vary up to several days at the ambient temperature condition. Alternatively, the polymer can be heated up to temperatures on the order of $100°$ to $150°$ C. which will aid particularly in the saturation of and cross-linking if desired of the product in accord with Reactions 4 and 5 above. Thus, the length of reaction at varying conditions will have a pronounced effect on the type of material obtained.

A relatively straightforward trial and error process can determine the conditions most suitable for the desired product. The saturation of the polymer can be tested by infrared spectroscopy, while the presence of free radicals can be obtained by electron spin resonance, or ESR analysis. For example, at ⅓ of an atmosphere pressure and a contact of three minutes between the fluorine and polymer, a significant amount of free radicals can be obtained as indicated by an ESR analysis while the saturation of the product is minimized, as indicated by IR analysis. The longer one reacts, the greater tendency will of course be to cross-link the material and get the saturation thus losing the free radicals, as indicated.

If a graft polymerization is desired, then one will attempt to maximize the presence of the free radicals on the polymer backbone or chain in accord with the aforegoing reaction conditions. After the desired reaction time period between the fluorine and the polymer, the fluorine source is shut off and the manifold system is evacuated for a period of ½ to 1 hour. The monomer is then admitted to the reaction vessel containing the polymeric material having the free radicals. If the monomeric material is in a liquid state, enough liquid is admitted to the polymer so as to immerse it in the liquid monomer. If the monomer, however, is in a normally gaseous state, such as tetrafluoroethylene, the gaseous monomer is supplied to the reaction vessel containing the polymer in a series of additions at the same monomer pressure. With each addition of gas, the pressure of the system is increased. If the monomeric material is being tied up onto the free radical sites on the polymeric backbone, the pressure of the gas decreases very rapidly. When the decrease becomes slow after admission of the monomer at the same gas pressure, there is thus an indication that most of the free radical sites are tied up and the grafting has been accomplished.

When the monomer is in a liquid state or a low boiling gas, after immersion of the polymer therein, the glass bulb containing the mixture is frozen and then vacuum sealed. The sealed tube is then allowed to remain for a period of time sufficient for the graft polymerization to occur. In some instances the tube may be placed under refrigeration. Especially when the monomer is a low boiling gas (e.g., perfluoropropylene oxide which boils at $-28°$ C.), the refrigeration reduces the vapor pressure exerted on the sealed tube for safety precaution and at the same time allows the graft reaction to occur. Alternatively, the sealed tube may be warmed in a suitable bath or the like over a period of the reaction time.

Once again, a trial and error process is involved to determine the length of contact time between the monomer and the polymeric material. This can be achieved by subjecting the reaction product to infrared analysis which will indicate the presence of the grafted monomer if such grafting occurred. One can tell by carrying out two identical grafting conditions, evacuate, characterize one and add liquid monomer back to the second without exposure to air or moisture. After a period of time, evacuate and characterize the two. At maximum amount of grafting, the product should be higher melting and the weight of the product should be increased. IR analysis can show the grafted monomer, when the monomer has characteristic absorption peaks different from and not covered by the polyperfluorobutadiene absorption peaks.

As can be appreciated, allowing the contact to continue for a significantly long period of time cannot cause an over-reaction since there are only a given number of reactive sites to be tied up by the monomeric material. Thus, to be on the safe side one does allow the reaction to occur for period of time from a few days up to two to three months. Cooling is required since the vapor pressure of monomer is too high at ambient for safety precaution in a sealed tube. In other instances, slight heating can increase rate of graft polymerization for some monomers which do not polymerize readily at ambient temperature. However, heating is generally not recommended in order to avoid side reactions. Thus, ambient temperature is the preferred temperature. After the grafting has transpired as indicated by increase of solid product, the excess liquid material is then removed leaving the product to be characterized by infrared analysis, softening points, solubility properties and others. The product of the invention may be either an elastomeric material or solid crosslinked product.

When the monomer is in a gas phase, the monomer is admitted as indicated in a series of additions at constant monomer pressure to the point where the decrease of pressure becomes quite slow. To assure a significant reaction period the monomeric gas pressure in the manifold and thus in the glass bulb containing the polymeric material as well is maintained at a constant level for a period of from a few hours up to several days or longer. Once again, as with the liquid reaction described above, one can periodically test the polymer to determine the degree of grafting that has transpired at a given point, so as to determine when to stop the flow of gas. Instead of a plurality of addition of gas at constant pressure at the beginning of the reaction period one can maintain a steady gaseous pressure of the monomer throughout.

It should be pointed out that the gaseous pressure maintained during length of reaction time is relatively low, on the order of below 1 to 5 atmospheres. Very successful results are obtained at a gaseous pressure of 3 atmospheres. Once again, as with the liquid reaction, the product of the gaseous monomer used in the polymerization is either an elastomeric material or a solid chunk of polymer.

In the examples of this invention, the creation of free radical sites and graft polymerization was carried out on polyperfluorobutadiene as a typical example of a polyperfluoropolyene material. Polyperfluorobutadiene is commercially available. Additionally, novel methods for preparing the materials are disclosed in copending application Ser. Nos. 848,325 and 848,351 filed Aug. 7, 1969 respectively. It is now believed the invention will be better understood from the following detailed specific examples.

EXAMPLE I

Preparation of polyperfluorobobutadiene in low density form

In order to suitably prepare the polyperfluorobutadiene in a low density form suitable for fluorination, 1.10 grams of the polyperfluorobutadiene which had a melting point of between 80° and 90° C. and a molecular weight of 5690, was added to several mls. of hexafluorobenzene which serves as a partial solvent therefor. The formed slurry was then placed in a Pyrex tube and freeze-dried by contacting the rotating tube with a bath of liquid nitrogen. Then the freeze-dried tube containing the frozen solid mixture was connected to a vacuum manifold system and the receiver was chilled in liquid nitrogen. The freeze-dried polyperfluorobutadiene was then warmed by water to 45° C. and evacuated. The remaining material in the tube was a light fluffy white powder.

EXAMPLE II

Graft copolymerization of polyperfluorobutadiene-tetrafluoroethylene

The Pyrex tube of Example I was cooled to −80° C. by a mixed Freon and liquid nitrogen bath. Gaseous fluorine which had been passed through a sodium fluoride scrubber was admitted to the tube at ⅓ atmosphere pressure. The gaseous fluorine remained in contact with the polyperfluorobutadiene for about one-half hour. During this period the temperature of the polymer was allowed to rise to ambient conditions. After the reaction period to create free radical sites the Pyrex tube was evacuated of the fluorine gas. Tetrafluoroethylene which had been passed through a silica gel column to remove terpene inhibitor which was present was then introduced into the Pyrex tube at from one to three atmospheres. An intermediate monomer pressure drop was observed. Three recharges of tetrafluoroethylene up to 3 atmospheres were followed by a period of four days at ambient temperature. The product formed was a white material which weighed 9.35 grams. The properties of the product formed in the tube at the top part thereof had a melting point of 320 to 380° C. and was not elastomeric. Its infrared spectrum was more similar to tetrafluoroethylene than to polyperfluorobutadiene. The product from the lower part of the tube had a melting point of between 113 and 120° C. It was flexible at ambient and cryogenic temperatures of as low as −196° C. The IR of the product from the top part, which melted around 320° to 380° C., shows a strong broad absorption band between 7.5 and 9.1$\mu$ indicating C—F absorption as in polytetrafluoroethylene with an additional very weak peak at 5.8$\mu$ indicating —CF=CF— group and another two very weak peaks at 9.7$\mu$ and 13.9$\mu$. The IR of product from lower part which melted between 113° and 120° C. also shows the strong broad band between 7.5 and 9.1$\mu$ indicating C—F, with medium a weak peak at 5.6$\mu$ indicating perfluorovinyl groups —CF=CF$_2$, and a weak peak at 5.8$\mu$ indicating perfluorovinylene groups (—CF=CF), very weak 7.3$\mu$ peak, weak 9.1$\mu$, medium 9.7$\mu$, weak 11$\mu$ and medium 13.9$\mu$ peaks.

EXAMPLE III

Graft copolymerization of polyperfluorobutadiene and hexafluoropropylene epoxy

This example indicates the ability to achieve the graft copolymerization of the invention without first forming the polyperfluorobutadiene into low density materials. A vacuum manifold system was again utilized and .12 grams of fractionated polyperfluorobutadiene having a melting point between 138 and 141° C. in a molecular weight of about 3530, was placed in a Pyrex tube together with several mls. of hexafluorobenzene at ambient temperature. A slurry-like material was formed in the tube. The Pyrex tube was evacuated at 70° C. and then cooled to −80° C. During the evacuation, hexafluorobenzene was condensed into another cooled tube as received or by a cold trap. After the tube had been cooled, gaseous fluorine which had been passed through a sodium fluoride scrubber was slowly introduced to a pressure of ⅔ an atmosphere. The fluorine was maintained in contact with the material in the tube for a 10 minute period of time at the aforegoing pressure. During this time period, the temperature of the tube had been raised to −20° C. by a mixed Freon and liquid nitrogen bath at −20° C. and then water bath at room temperature. At completion of the reaction time between the fluorine and the polymer to create free radical sites, the tube was then evacuated at ambient temperature. This was followed by condensing 1.27 grams of hexafluoropropylene epoxide into the reaction tube. After the epoxide was condensed into the tube, the tube was chilled in liquid nitrogen, then vacuum sealed and placed in a refrigerator for sixty days to allow the grafting to occur. The use of a refrigerator was for safety precaution, due to the low boiling point of hexafluoropropylene epoxide at −28° C. and to avoid a high vapor pressure condition at ambient temperature in a sealed tube. At the end of the sixty day period, the unreacted hexafluoropropylene oxide was discharged into another tube through the vacuum manifold system. A remaining white residue was evacuated at 50° C. for an hour to give .87 grams of a polymer having a melting point between 275° and 285° C. The product was insoluble in hexafluorobenzene and had an infrared spectrum as a KBr pellet which had a strong broad peak at 7.5 to 9.1$\mu$ indicating C—F absorption, weak peaks at 3.6$\mu$ indicating perfluorovinyl groups and at 5.8$\mu$ indicating —CF=CF— groups. It can be seen that in this example the polyperfluorobutadiene was partially dissolved in a solvent. However, unlike Example I, there was no freeze-drying with a subsequent sublimation of the solvent, yet grafting did transpire.

EXAMPLE IV

Graft copolymerization of polyperfluorobutadiene and perfluorobutadiene

In this example, the polyperfluorobutadiene subjected to the fluorination was not even dissolved in a solvent therefor as in previous Example III. As a result, .10 grams of fractionated polyperfluorobutadiene (hexafluorobenzene soluble fraction) having a molecular weight of 3530 was weighed into a Pyrex reaction tube and evacuated at 65° C. for one hour to remove any moisture or trace solvent. The tube was then cooled to −80° C. while connected to a vacuum manifold. Gaseous fluorine which had been passed through a sodium fluoride scrubber to remove any trace amounts of hydrogen fluoride impurity, was introduced slowly into the reaction tube up to ⅓ atmosphere at the −80° C. temperature. The tube was then evacuated at −20° C. for ten minutes before finally warming the tube by 25° C. water bath to ambient temperature. The resulting polyperfluorobutadiene was thus provided with free radical sites. .91 grams of perfluorobutadiene was then condensed into the tube containing the polymer and the tube was then sealed under vacuum. The sealed polymerization tube was then placed in a 60° C. bath for three weeks. The 60° C. bath was used to speed up the polymerization of perfluorobutadiene. The three weeks period was selected, because usually the polymerization time for perfluorobutadiene in the presence of a free radical catalyst shows a substantial amount of polymer in a three week period. The unpolymreized monomer remaining in the tube after the end of the three-week period was then transferred to another tube. The residue was evacuated at ambient temperature for one hour to give .18 grams of a white resin. This resin was insoluble in hexafluorobenzene, concentrated sulfuric acid, concentrated ammonium hydroxide, dimethyl sulfoxide, dimethyl formamide and other solvents utilized for fluorocarbons. The solvents were tested at both ambient and boiling temperatures. The change of solubility characteristics of the resin product from the starting polymer being soluble in hexafluorobenzene indicated cross-linked and branched polyperfluorobutadiene. Also, the infrared spectrum for the resin product shows an increase in intensity of the 5.6μ band (perfluorovinyl groups) from weak to medium absorption peaks. This indicates that the branched and crosslinked fragments of polyperfluorobutadiene favor a higher degree of 1,2-polymerization than the linear starting material.

EXAMPLE V

Fluorine saturation of polyperfluorobutadiene

In this example the procedure of Example IV was essentially followed. However, the contact time and temperatures between the fluorine gas the polymer material were significantly increased. The gaseous fluorine rather than being evacuated at ⅓ atmosphere, as stated in Example IV, was gradually increased to 1 atmosphere for one day, while the temperature of the tube containing the polymer was maintained at ambient condition. At end of the first day, the fluorine pressure was increased to 2 atmospheres and the tube heated to 125° C. These conditions of increased pressure and temperature were maintained for another day. Finally, the polymeric material was subjected at four hours of contact to the fluorine under a pressure of 2 atmospheres, while the temperature of the polymer was raised to 150° C. At the end of this period, the gaseous phase was evacuated at room temperature. The remaining white resin was washed with water and hexafluorobenzene and dried. This resin was insoluble in concentrated sulfuric acid, dimethyl sulfoxide, hexafluorobenzene, dimethyl formamide and chloroform, at ambient and boiling temperatures. The resulting product was not completely saturated and had a carbon content of 24.37 and fluorine content of 74.9 as determined by elemental analysis. The infrared spectrum for the formed polyperfluorobutadiene after the fluorination had a strong broad peak at 7.5 to 9.1μ, a weak peak at 5.6μ and the disappearance of 5.8μ peak.

I claim:
1. A method of treating polyperfluoropolyene to provide free radical sites thereon comprising:
   dissolving as much of said polyperfluoropolyene as will go into solution in a suitable solvent therefor,
   providing a source of fluorine gas, directing said fluorine gas to said dissolved polyperfluoropolyene for a period of time sufficient to create free radical sites thereon.
2. A method of treating polyperfluoropolyene to provide free radical sites thereon comprising:
   forming the polyperfluoropolyene into a finely divided form,
   providing a source of fluorine gas, directing said fluorine gas to said finely divided polyperfluoropolyene for a period of time sufficient to create free radical sites thereon.
3. The method of claim 2 comprising:
   dissolving as much of said polymer as will go into solution in a suitable solvent therefor,
   freeze drying said solution,
   and subliming said solvent from said solution leaving a finely divided polymer.
4. A method of treating polyperfluoropolyenes to provide free radical sites thereon comprising:
   providing said polyperfluoropolyene in a suitable reaction vessel,
   providing a source of fluorine gas,
   directing said fluorine gas to said polyperfluoropolyene for a period of time sufficient to create free radical sites thereon,
   and attaching monomers to said free radical sites by contacting said formed polyperfluoropolyene product with a monomer which undergoes free radical polymerization.
5. The method of claim 4 wherein said monomer is a liquid and further comprising:
   contacting said polymer product with sufficient liquid monomer to submerse said polymer therein.
6. The method of claim 4 wherein said monomer is a gas and further comprising:
   contacting said polymer product with short bursts of gaseous monomer under controlled pressure, whereupon the pressure decreases rapidly after each burst until said free radical sites are occupied by said monomer.
7. The method of claim 4 wherein:
   said polymer is polyperfluorobutadiene and said monomer is selected from the group consisting of perfluorobutadiene, tetrafluoroethylene and hexafluoropropylene epoxide.

References Cited

UNITED STATES PATENTS

| | | | |
|---|---|---|---|
| 2,711,972 | 6/1955 | Miller et al. | 260—92.1 |
| 3,253,057 | 5/1966 | Landler et al. | 260—877 |

SAMUEL H. BLECH, Primary Examiner

U.S. Cl. X.R.

260—33.8 F, 92.1, 879, 890